(12) United States Patent
Kokeguchi

(10) Patent No.: US 8,540,275 B2
(45) Date of Patent: Sep. 24, 2013

(54) AIRCRAFT AIRBAG, AIRBAG DEVICE, AND AIRCRAFT

(75) Inventor: Akira Kokeguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/516,395

(22) PCT Filed: Nov. 8, 2010

(86) PCT No.: PCT/JP2010/069805
§ 371 (c)(1),
(2), (4) Date: Jun. 15, 2012

(87) PCT Pub. No.: WO2011/074350
PCT Pub. Date: Jun. 23, 2011

(65) Prior Publication Data
US 2012/0256399 A1    Oct. 11, 2012

(30) Foreign Application Priority Data
Dec. 16, 2009    (JP) .................. 2009-285432

(51) Int. Cl.
*B60R 21/16* (2006.01)
(52) U.S. Cl.
USPC .......................................... 280/729
(58) Field of Classification Search
USPC .................. 280/728.2, 729, 730.1, 743.1
See application file for complete search history.

(56) References Cited

U.S. PATENT DOCUMENTS

| | | | | |
|---|---|---|---|---|
| 3,603,535 A | * | 9/1971 | DePolo ......................... | 244/121 |
| 5,222,761 A | * | 6/1993 | Kaji et al. .................. | 280/730.2 |
| 5,335,884 A | * | 8/1994 | Kalberer et al. .............. | 244/121 |
| 5,340,059 A | * | 8/1994 | Kanigowski .................. | 244/121 |
| 5,547,149 A | * | 8/1996 | Kalberer et al. .............. | 244/121 |
| 6,343,811 B1 | * | 2/2002 | Hammer et al. ........... | 280/730.2 |
| 6,957,828 B2 | | 10/2005 | Keeslar et al. | |
| 7,648,160 B2 | * | 1/2010 | Mori et al. ................ | 280/730.1 |
| 7,967,334 B2 | * | 6/2011 | Breuninger et al. ....... | 280/743.1 |
| 2004/0178614 A1 | * | 9/2004 | Countryman et al. ..... | 280/743.1 |
| 2009/0178597 A1 | * | 7/2009 | Sliwa, Jr. .................... | 109/49.5 |
| 2013/0106079 A1 | * | 5/2013 | Jarboe et al. .............. | 280/730.1 |

FOREIGN PATENT DOCUMENTS

| | | |
|---|---|---|
| JP | S47-029530 B1 | 8/1972 |
| JP | S47-017340 U | 10/1972 |
| JP | H06-024283 A | 2/1994 |
| JP | 2000-280845 A | 10/2000 |
| JP | 2002-059803 A | 2/2002 |
| JP | 2005-001412 A | 1/2005 |
| JP | 2006-312406 A | 11/2006 |
| JP | 2007-099122 A | 4/2007 |
| JP | 2008-049858 A | 3/2008 |

* cited by examiner

OTHER PUBLICATIONS

International Search Report from the International Bureau of WIPO for International Application No. PCT/JP2010/069805 dated Feb. 8, 2011 (2 pages) and an English translation of the same (2 pages).

*Primary Examiner* — Toan To
(74) *Attorney, Agent, or Firm* — Fitch, Even, Tabin & Flannery, LLP

(57) ABSTRACT

Provided are an aircraft airbag that inflates across a plurality of seats, an airbag device including this airbag, and an aircraft equipped with this airbag device. The airbag has a bag main body extending across three seats and in the left-right direction of the aircraft body, and partition panels that partition the inside of the bag main body into small chambers and corresponding to the seats. Gas from the inflator flows into the small chamber in the middle, and flows into the small chambers through the communication portions above and below the partition panels. When occupants are caught and thereby the pressures in the small chambers reach a predetermined value or more, vent holes open.

11 Claims, 4 Drawing Sheets

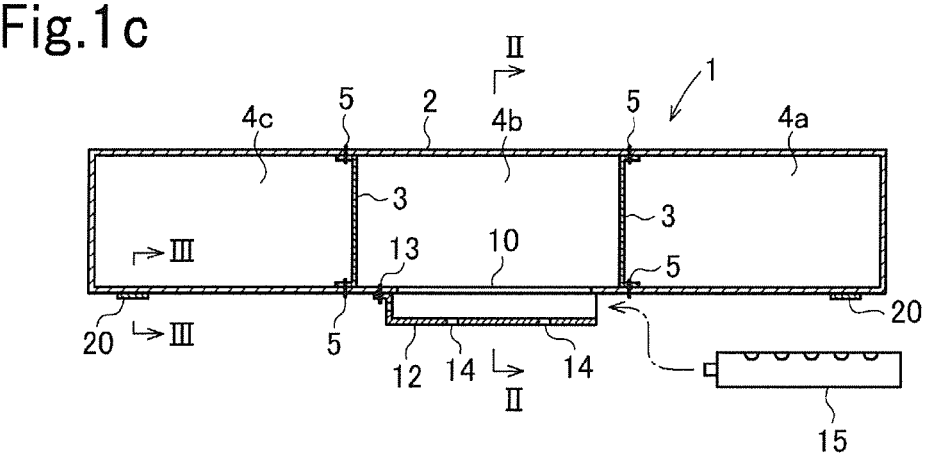
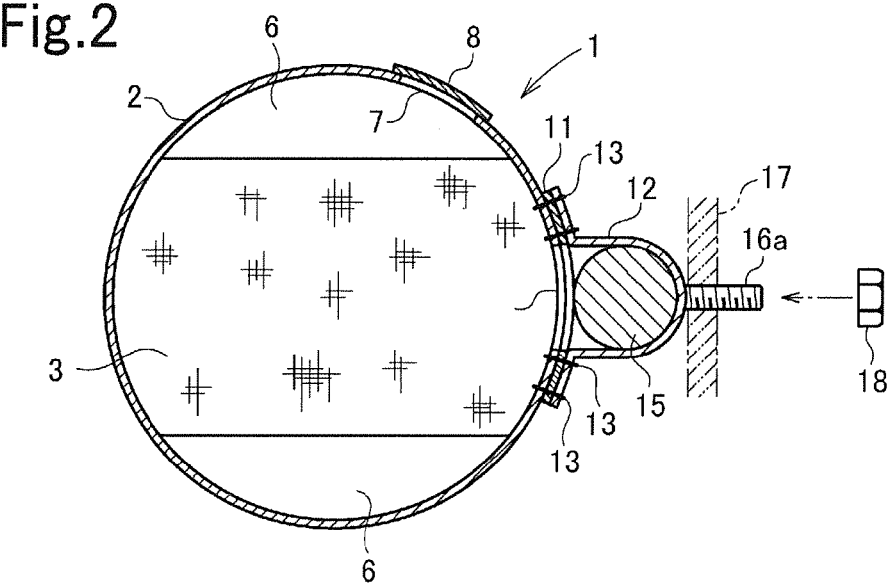

AIRCRAFT AIRBAG, AIRBAG DEVICE, AND AIRCRAFT

CROSS-REFERENCE TO RELATED APPLICATIONS

This application is a U.S. national phase application filed under 35 U.S.C. §371 of International Application PCT/JP2010/069805, filed on Nov. 8, 2010, designating the United States, which claims priority from Japanese Application 2009-285432, filed Dec. 16, 2009, which are hereby incorporated herein by reference in their entirety.

FIELD OF THE INVENTION

The present invention relates to an aircraft airbag, an airbag device, and an aircraft equipped with this airbag device.

BACKGROUND OF THE INVENTION

An airbag device for restraining an occupant sitting in a seat of an aircraft is described in Japanese Examined Patent Application Publication No. 47-29530.

The airbag device described in this publication is installed in the back part of a seat in front of a seat of an aircraft. This airbag is inflated by being supplied with air from an electric compressor or a high-pressure cylinder.

SUMMARY OF THE INVENTION

The airbag of Japanese Examined Patent Application Publication No. 47-29530 has a width corresponding to a seat. Thus, in the case where a plurality of seats are arranged in a row in the left-right direction as in an aircraft, it is necessary to install the same number of airbag devices as the number of seats, and the weight and installation cost increase.

It is an object of the present invention to provide an aircraft airbag that inflates across a plurality of seats, an airbag device including this airbag, and an aircraft equipped with this airbag device.

An aircraft airbag according to a first aspect is an aircraft airbag installed in front of seats of an aircraft, including a bag main body having a length such that it is continuously disposed in front of a plurality of seats, one or more partition panels provided so as to partition the bag main body into a plurality of small chambers arranged in the longitudinal direction of the bag and to allow adjacent small chambers to communicate with each other, and one or more vent holes provided in the bag main body.

An aircraft airbag according to a second aspect is the aircraft airbag according to the first aspect, wherein the same number of small chambers as the number of the seats are provided, and the one or more partition panels are arranged such that one small chamber exists in front of one seat.

An aircraft airbag according to a third aspect is the aircraft airbag according to the first or second aspect, wherein three or more small chambers are formed, and an inflator installation portion is provided in the bag main body facing the small chamber in the middle in the longitudinal direction of the bag main body.

An aircraft airbag according to a fourth aspect is the aircraft airbag according to any one of the first to third aspects, wherein the one or more vent holes are one or more constant-pressure vent holes that open when the pressure in the bag main body reaches a predetermined value or more.

An aircraft airbag according to a fifth aspect is the aircraft airbag according to any one of the first to fourth aspects, wherein the one or more partition panels connect the front part and rear part of the bag main body.

An aircraft airbag according to a sixth aspect is the aircraft airbag according to any one of the first to fifth aspects, wherein fasteners for fastening the ends in the longitudinal direction of the bag main body to an aircraft body member are provided.

An aircraft airbag device according to a seventh aspect includes the aircraft airbag according to any one of the first to sixth aspects, and an inflator for inflating the aircraft airbag.

An aircraft according to an eighth aspect is an aircraft in which the airbag device according to the seventh aspect is installed in a wall in front of seats.

The bag main body of the airbag of the present invention has a length such that it is continuously disposed in front of a plurality of seats. Thus, occupants in plurality of seats can be caught and restrained with a single airbag device.

The inside of this airbag is partitioned by one or more partition panels into a plurality of small chambers. Thus, when an occupant or occupants crash into only one or some of the small chambers, the pressure or pressures in the one or some of the small chambers increase, and the occupant or occupants are restrained. The bag main body is provided with one or more vent holes. Thus, when the pressure in the bag main body has increased, gas in the bag main body flows out through the one or more vent holes, and the impact on the occupant or occupants is absorbed.

In the case where the one or more vent holes are one or more constant-pressure vent holes, the one or more vent holes are closed when the gas pressures in the small chambers are low, and thus the gas pressures in the small chambers increase rapidly. When the gas pressures in the small chambers reach a predetermined value or more, the one or more constant-pressure vent holes open, gas flows out of the small chambers, and impact is absorbed.

In the case where the same number of small chambers as the number of the seats are provided and one small chamber exists in front of one seat, one occupant is caught by one small chamber. In the case where three or more small chambers are arranged in the longitudinal direction of the bag main body, disposing an inflator or inflators in the small chamber or small chambers in the middle makes it possible to rapidly inflate the entire airbag with one or a few inflators.

When the one or more partition panels connect the front part and rear part of the bag main body, the rearward protruding length when the airbag inflates is limited.

By fastening the ends in the longitudinal direction of the bag main body to an aircraft body member, the positions of the ends in the longitudinal direction of the airbag during inflation are stabilized.

By installing this airbag device in a wall in front of seats, the occupants can be prevented from directly colliding with the wall during aircraft collision.

BRIEF DESCRIPTION OF THE DRAWINGS

FIG. 1b is a sectional view taken along line Ib-Ib of FIG. 1a.

FIG. 1c is a sectional view taken along line Ic-Ic of FIG. 1a.

FIG. 2 is an enlarged sectional view taken along line II-II of FIG. 1c.

FIG. 6b is an arrow view taken along line VIb-VIb of FIG. 6a.

DETAILED DESCRIPTION OF THE PREFERRED EMBODIMENTS

With reference to FIG. 1a to FIG. 6b, a first embodiment will be described. In the following description, front-rear direction means the front-rear direction of the aircraft body.

Figure 1A:
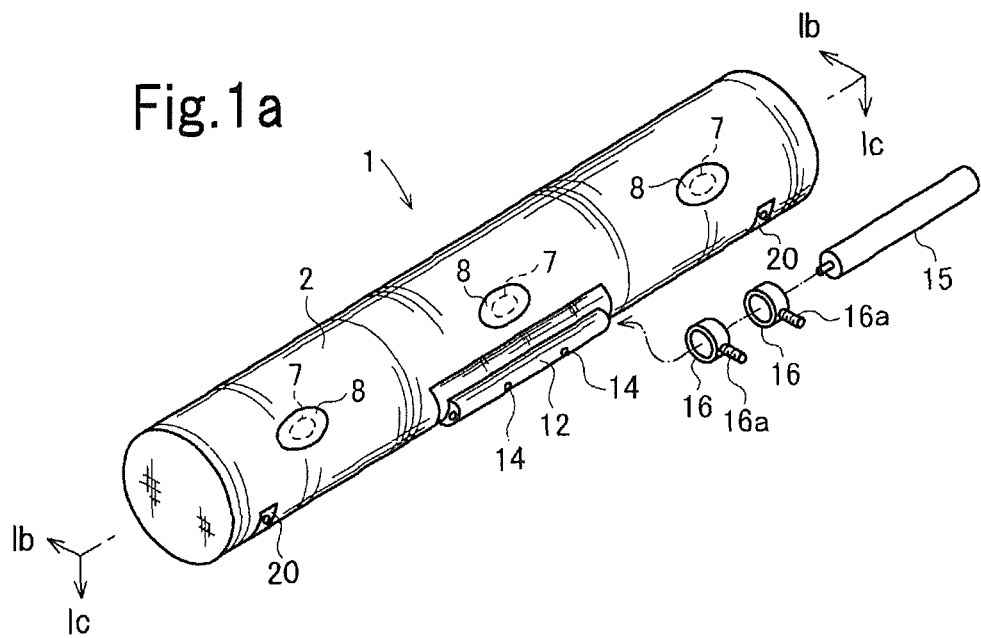
FIG. 1a is a perspective view showing an aircraft airbag according to an embodiment.
Figure 1B:
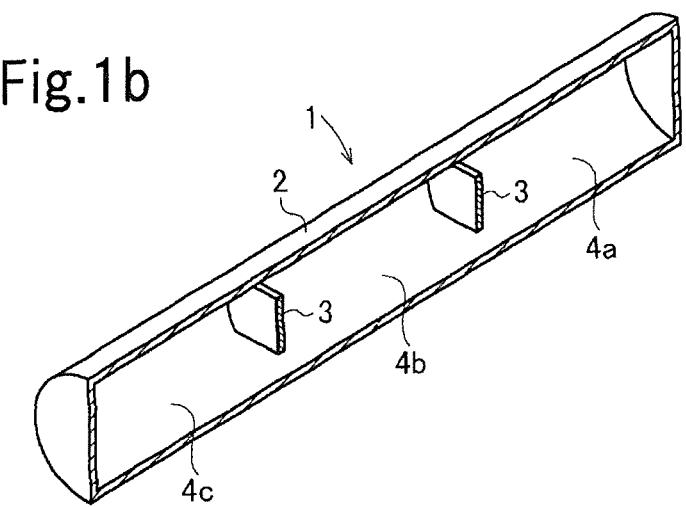

As shown in FIGS. 1a to 1c and 2, an airbag 1 has a generally cylindrical bag main body 2, and (n−1) partition panels 3 that partition the inside of the bag main body 2 into a plurality of (n, three in this embodiment, i.e., n=3) small chambers 4a, 4b, and 4c. This airbag 1 is placed such that the longitudinal direction thereof is the left-right direction of the aircraft body. Each partition panel 3 has a shape such that the upper part and lower part of a circle are cut away in the chordal direction, and the rear edge and front edge thereof are each sewn to the bag main body 2 by a seam 5 (FIG. 1c).

Between the upper edge and lower edge of each partition panel 3 and the bag main body 2, communication portions 6 (FIG. 2) that allow the adjacent small chambers 4a and 4b and small chambers 4b and 4c to communicate with each other are formed.

In the upper surface of each of the small chambers 4a, 4b, and 4c, a vent hole 7 is provided. Each vent hole 7 is closed by a synthetic resin film 8. This film 8 is bonded to the periphery of the vent hole 7 with adhesive. The films 8 have a strength such that when the gas pressures in the small chambers 4a, 4b, and 4c reach a predetermined value or more, they tear and open the vent holes 7. Instead of the films 8, pieces of cloth may be sewn to the bag main body 2 by tear seams so as to close the vent holes 7. These tear seams tear and open the vent holes 7 when the gas pressures in the small chambers 4a, 4b, and 4c reach a predetermined value or more.

An opening 10 for an inflator is provided in the bag main body 2 so as to face the front part of the small chamber 4b in the middle. An inflator protecting cloth 12 is sewn to the periphery of this opening 10 with a patch cloth 11 (shown only in FIG. 2) therebetween by seams 13. The opening 10 extends in the longitudinal direction of the bag main body 2 and is generally rectangular. The patch cloth 11 is like a rectangular frame surrounding the opening 10. The upper edge, the lower edge, and one of the vertical edges of the inflator protecting cloth 12 are respectively sewn to the upper edge, the lower edge, and one of the vertical edges of the opening 10, and the inflator protecting cloth 12 bulges forward away from the opening 10. The inflator protecting cloth 12 is provided with small holes 14 for insertion of bolts 16a described later.

An inflator 15 is inserted between the inflator protecting cloth 12 and the opening 10. In this embodiment, annular metal holders 16 having bolts 16a are attached to the inflator 15. After the metal holders 16 are fitted onto the inflator 15, the inflator 15 is inserted into the inflator protecting cloth 12, and the bolts 16a are protruded forward through the small holes 14. The bolts 16a are inserted into openings 17a of an aircraft body member 17, and nuts 18 are tightened, and thereby the inflator 15 and the airbag 1 are attached to the aircraft body member 17.

Figure 3:
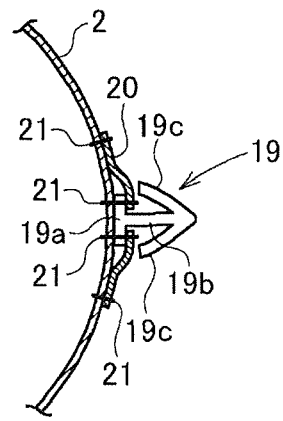
FIG. 3 is an enlarged sectional view taken along line III-III of FIG. 1c.

At each end in the longitudinal direction of the airbag 1, a fastener 19 for fastening the airbag 1 to the aircraft body member 17 is provided. As shown in FIG. 3, this fastener 19 has a plate-like base 19a, a shaft portion 19b protruding forward from the base 19a, and an overhanging portion 19c overhanging rearward from the distal end of the shaft portion 19b. The base 19a is sewn to the bag main body 2 with a patch cloth 20 therebetween by a seam 21.

This overhanging portion 19c is inserted into a fastening hole (not shown) that is a small hole provided in the aircraft body member 17, and thereby both ends of the airbag 1 are fastened to the aircraft body member 17. When inserted into the fastening hole, the overhanging portion 19c elastically reduces its diameter. After passing through the fastening hole, the overhanging portion 19c returns to its original shape, and is engaged with the fastening hole.

Figure 4:
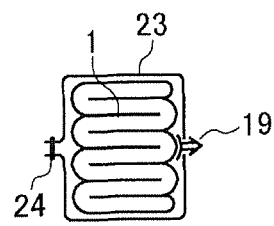
FIG. 4 is a sectional view of a folded airbag.

The airbag to which the inflator 15 and the fasteners 19 are attached is folded into an elongate folded body, and is contained in an airbag holding cover 23 as shown in FIG. 4. This folded body has the same length as the length in the longitudinal direction of the bag main body 2. The bolts 16a and the fasteners 19 are protruded forward from the airbag holding cover 23. The airbag 1 that is inserted into the airbag holding cover 23 and whose shape is retained is attached to the aircraft body member 17 with the bolts 16a, the nuts 18, and the fasteners 19. The airbag holding cover 23 is sewn into a tubular shape by a tear seam 24. When the airbag 1 inflates, the tear seam 24 tears.

Figure 5:
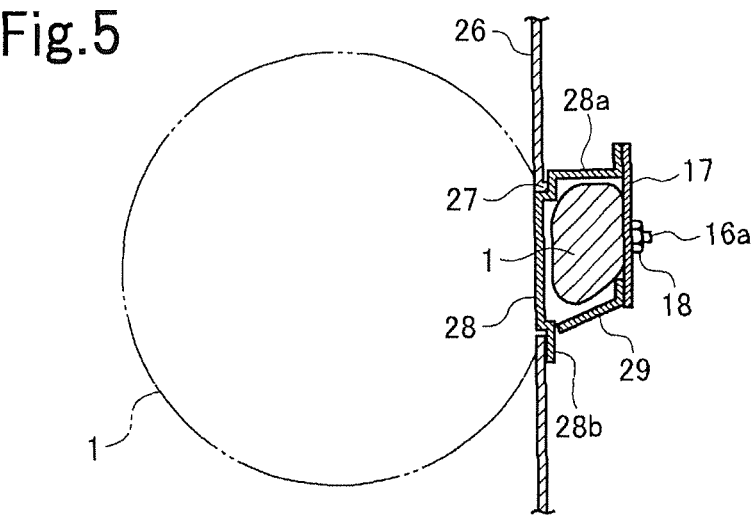
FIG. 5 is a vertical sectional view of a wall equipped with an airbag device.
Figure 6A:
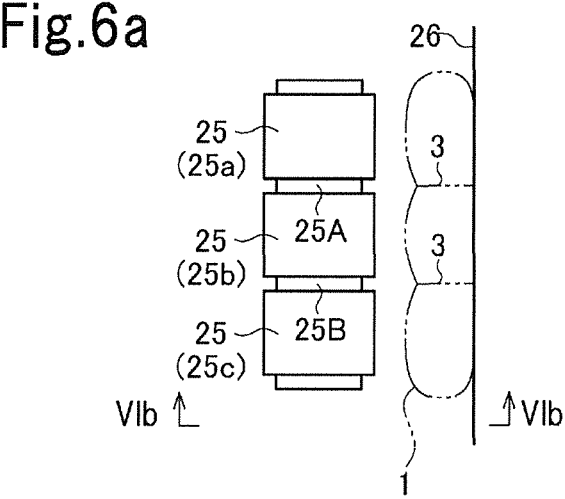
FIG. 6a is a plan view of seats facing a wall.
Figure 6B:
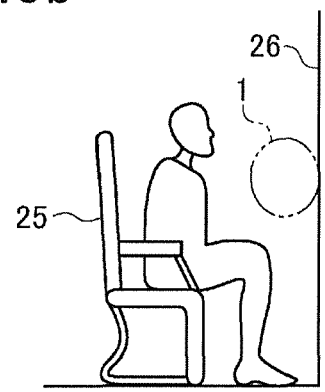

As shown in FIGS. 5, 6a, and 6b, the aircraft body member 17 is disposed behind the wall 26 in front of the seats 25, and extends in the left-right direction of the aircraft body. The wall 26 is provided with an opening 27 through which the airbag 1 inflates. This opening 27 is closed by a lid 28. The front end of the leg portion 28a on the upper edge side of the lid 28 is fastened to the aircraft body member 17 with bolts, rivets, or the like. The lower end 28b of the lid 28 is engaged with the back of the lower edge of the opening 27. A plate 29 is placed so as to close the gap between the lower edge of the opening 27 and the aircraft body member 17. This plate 29 is fixed to the aircraft body member 17.

As shown in FIG. 6a, in this embodiment, three seats 25 (25a, 25b, and 25c) are arranged in the left-right direction of the aircraft body. When the airbag 1 is inflated, the airbag 1 has a length such that it extends in front of and across all the seats 25a to 25c. The partition panels 3 are located in front of armrests 25A and 25B between the seats 25a and 25b and between the seats 25b and 25c.

If an aircraft having this airbag device collides, the inflator 15 is activated, and the airbag 1 tears the tear seam 24 and inflates. The airbag 1 push-opens the lid 28, inflates in front of the seats 25 as shown by long dashed double-short dashed line in FIG. 5 and FIGS. 6a and 6b, and restrains the occupants.

Gas from the inflator 15 first flows into the small chamber 4b and inflates this, and flows through the communication portions 6 into the left and right small chambers 4a and 4c and inflates these. When the occupants crash into the airbag 1 and the gas pressures in the small chambers reach a predetermined value or more, the films 8 tear, gas flows out through the vent holes 7, and the impact is absorbed.

When all the three seats 25a, 25b, and 25c are occupied by occupants, the pressures in all the small chambers 4a, 4b, and 4c increase. When only one or some of the seats are occupied by occupants (for example, when only the seat 25b is occupied by an occupant), the pressure in the small chamber 4b into which the occupant crashes increases. Since the partition panels 3 exist between this small chamber 4b and the adjacent small chambers 4a and 4c, the gas pressure in the small chamber 4b is higher than those in the small chambers 4a and 4c, and the occupant is caught by the small chamber 4b. At this time, if the gas pressure in the small chamber 4b reaches a predetermined value or more, the vent hole 7 of the small chamber 4b opens, and gas flows out. It is the same when only another seat or any two seats are occupied by an occupant or occupants.

The area of the partition panels 3 is preferably 5% or more and more preferably 50% or more of the cross-sectional area of the airbag 1 so that when an occupant or occupants crash into only one or some of the small chambers, the gas pressure in the small chamber or chambers is higher than that of the other small chamber or chambers. In order to cause gas supplied to one small chamber 4b to flow smoothly into the adjacent small chambers 4a and 4c, and to prevent the vent hole 7 of the small chamber 4b from being opened only by the gas pressure from the inflator before the occupant is caught, the area of the partition panels 3 is preferably 80% or less and more preferably 70% or less of the cross-sectional area of the airbag 1.

It is preferable that the films 8 closing the vent holes 7 tear when the gas pressures in the small chambers have increased from 1.2 to 1.8 times the maximum pressure of each small chamber when the airbag 1 is inflated without catching any occupants (this maximum pressure is preferably 15 to 35 KPa and more preferably about 25 KPa).

In this embodiment, the partition panels 3 are provided so as to connect the front surface and rear surface of the bag main body 2. Thus, when the airbag 1 inflates from the wall 26 toward the rear of the aircraft body, the rearward protruding length of the airbag 1 is limited. In this embodiment, both ends in the longitudinal direction of the airbag 1 are fastened to the aircraft body member 17 with the fasteners 19. Thus, when the airbag 1 is inflated, the rearward protruding length from the wall 26 at both ends in the longitudinal direction of the airbag 1 is equal to that in the middle in the longitudinal direction of the airbag 1.

Although, in the above-described embodiment, all the small chambers are provided with a vent hole 7, the vent hole 7 of the small chamber 4b in the middle may be omitted. In this case, when the occupant crashes into the small chamber 4b, the gas pressure in the small chamber 4b is transmitted to the small chambers 4a and 4b, the vent holes of the small chambers 4a and 4b open, and the impact is absorbed. In such an aspect, the area of the partition panels 3 is preferably 5 to 80% and more preferably 10 to 60% of the cross-sectional area of the airbag 1. In this case, even if the small chamber 4b is not provided with the vent hole 7, the vent holes can be prevented from being opened by the temporary increase in internal pressure at the start of airbag inflation.

The area of the partition panels 3 is preferably determined in consideration of the increase in pressure in the middle small chamber 4b at the start of airbag inflation. If the pressure in the small chamber 4b at the start of airbag inflation is higher than the pressure in the small chamber 4b when the occupant is caught, an excessive base cloth strength is necessary in order for the small chamber 4b to withstand the increase in internal pressure. If the area of the partition panels is set to 80% or less of the area of the bag and thereby the pressure in the small chamber 4b at the start of airbag inflation is equal to or lower than the pressure when the occupant is caught, the necessary strength of the base cloth is reduced.

Figure 7:
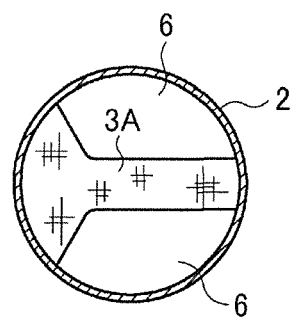
FIG. 7 is a sectional view of an airbag according to another embodiment.

An example of a partition panel having a reduced area is shown in FIG. 7. The vertical width of the rear part of this partition panel 3A is large, whereas the vertical width of the middle part and front part of this partition panel 3A is small. Thus, this partition panels 3A is smaller in area than the above-described partition panels 3. Since the vertical width of the rear part of the partition panel 3A is large, the rearward protruding lengths of the upper part and lower part of the rear surface of the bag main body 2 are limited.

The above is only one example of the present invention, and the present invention includes other aspects (not shown).

Although embodiments of the present invention have been described in detail, it is obvious to those skilled in the art that various changes can be made without departing from the spirit and scope of the present invention.

The invention claimed is:

1. An aircraft airbag installed in front of seats of an aircraft, comprising:
    a bag main body having a length such that it is continuously disposed in front of a plurality of seats;
    one or more partition panels provided so as to partition the bag main body into a plurality of small chambers arranged in the longitudinal direction of the bag and to allow adjacent small chambers to communicate with each other; and
    one or more vent holes provided in the bag main body.

2. The aircraft airbag according to claim 1, wherein the same number of small chambers as the number of the seats are provided, and the one or more partition panels are arranged such that one small chamber exists in front of one seat.

3. The aircraft airbag according to claim 1, wherein three or more small chambers are formed, and an inflator installation portion is provided in the bag main body facing the small chamber in the middle in the longitudinal direction of the bag main body.

4. The aircraft airbag according to claim 1, wherein the one or more vent holes are one or more constant-pressure vent holes that open when the pressure in the bag main body reaches a predetermined value or more.

5. The aircraft airbag according to claim 1, wherein the one or more partition panels connect the front part and rear part of the bag main body.

6. The aircraft airbag according to claim 1, wherein fasteners for fastening the ends in the longitudinal direction of the bag main body to an aircraft body member are provided.

7. The aircraft airbag according to claim 1, wherein each small chamber is provided with the vent hole.

8. The aircraft airbag according to claim 1, wherein three or more small chambers are provided,
    the small chamber in the middle in the longitudinal direction of the bag main body is not provided with the vent hole, and
    the small chambers at both ends in the longitudinal direction of the bag main body are each provided with the vent hole.

9. The aircraft airbag according to claim 5, wherein communication portions that allow adjacent small chambers to communicate with each other are provided between the upper edge and lower edge of each partition panel and the bag main body.

10. An aircraft airbag device comprising: the aircraft airbag according to claim 1; and an inflator for inflating the aircraft airbag.

11. An aircraft in which the airbag device according to claim 10 is installed in a wall in front of seats.

* * * * *